3,173,004
GAS DENSITY MEASURING APPARATUS USEFUL AS ALTIMETER

James Montgomery McKenzie, East Northport, N.Y., assignor to North American Philips Co., Inc., New York, N.Y., a corporation of Delaware
Filed July 17, 1961, Ser. No. 124,588
9 Claims. (Cl. 250—43.5)

This invention relates to apparatus for measuring the density of a fluid medium, such as a gas, and has special application as an aircraft altimeter to measure the altitude of high flying aircraft. This application is a continuation-in-part of my prior copending application Serial No. 55,583, filed Sept. 12, 1960, now abandoned.

The prior art altimeters presently available for measuring the altitude of high flying aircraft have not been completely satisfactory. Radio type altimeters which utilize radar principles suffer from the drawback that they locate the aircraft by a terrestrial contour rather than by a smoother pressure contour. A radiation type altimeter has also been used involving the detection with a Geiger counter or photomultiplier detector of beta rays back scattered by the air. This device, however, has at best an accuracy of ±500 feet at an altitude of 20,000 feet, and in practice the accuracy has been considerably less.

An object of the invention is a new apparatus of the radiation type for measuring gas density.

A further object of the invention is a new gas density measuring apparatus especially useful for measuring the altitude with extreme accuracy of aircraft flying at altitudes of the order of 20,000 feet and higher.

These objects are achieved by an apparatus employing a source of heavy particles and a semiconductor detector for detecting the heavy particles after their passage through a sample of the fluid medium or gas whose density is to be measured. I have discovered that it is possible to measure with a semiconductor detector heavy particle energy to an extraordinarily high resolution, which means that only slight variations in the gas density are easily detected and measured. When this combination is employed as an altimeter, it becomes possible to measure altitudes of, for example, 25,000 feet to an accuracy of ±50 feet, which is better by at least an order of magnitude than any of the prior art devices.

The invention will now be described in greater detail with reference to the accompanying drawing, in which.

Figure 1:
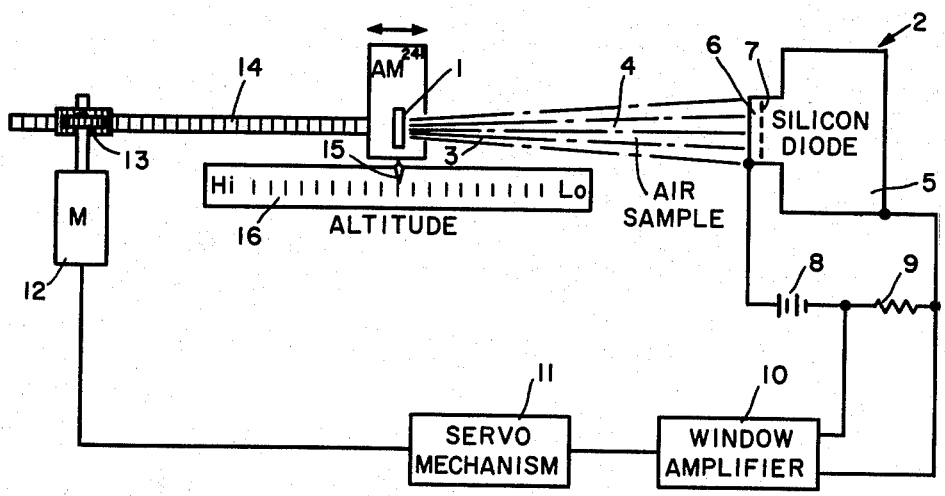
FIG. 1 is a diagrammatic view of the apparatus of the invention as an aircraft altimeter.

The apparatus of the invention will be described in detail in connection with its use as an aircraft altimeter, though it is to be understood that it has general utility in any application where measurements or indications of the density of a fluid, such as a gaseous medium is desired. The altimeter employing the apparatus of the invention is primarily intended for use at high altitudes of the order of 20,000 feet or higher. This is accomplished by measuring the density of samples of the air at that altitude. The density of the air at that altitude is about 0.5 mg./cm.$^2$, and decreases at higher altitudes. The inventive apparatus relies on the partial absorption of the heavy particle energy by the comparatively rarefied air sample due to inelastic collisions of the heavy particles with the air molecules.

For the inventive apparatus to perform, the particles employed must be of reasonable mass, and they must be absorbable or lose energy in the gas medium. The invention is, therefore, mainly limited to only certain particles and only for measuring density ranges wherein significant energy loss of the particles employed obtains. Suitable particles include electrons, protons or heavier charged particles up to fission fragments. They thus include deuterons, alpha particles, and He$^3$ particles. The particle source should be a monochromatic source. I have found that alpha particles are very well suited for this purpose. They are available from commercial sources as predominately single line alphas. Suitable sources include radioactive isotopes, such as U$^{235}$ and Pu$^{240}$. I prefer to use Am$^{241}$, which generates alpha particles with an energy of 5.477 mev.

The density range in which these kinds of particles suffer significant energy loss is between about 1.0 and 0.1 mg./cm.$^2$, and hence the apparatus of the invention is intended primarily for the measurement of such densities. As an altimeter, this corresponds to altitudes between about 6,000 and 60,000 feet.

The alpha particles are emitted from their source with a finite energy which can be measured to a few parts per 10,000. A semiconductor detector, in contrast to other known alpha detectors, has this ability to measure the alpha particle energy to an extraordinarily high resolution. Detection of these alpha particles with any kind of an energy responsive detector generally is in a form relating the intensity or number of alpha particles in a relatively small energy range to their absolute energy, and the detector used conventionally generates electrical pulses at a rate proportional to the number of incident alpha particles, and with amplitudes proportional to the energy of the detected alpha particles. These pulses are then passed through a linear amplifier and a pulse height analyzer or window analyzer which has the ability of passing to a rate meter or counting circuit only those electrical pulses falling within a narrow range of amplitudes. By scanning all of the electrical pulse amplitudes generated, one can compute or directly record the so-called pulse height distribution of the generated pulses. With alpha particles of known energy this takes the form of a graph relating the number of counts or generated electrical pulses per channel of the amplifier or amplitude interval as a function of the pulse height or energy of the alpha particles. The resultant graph, with a line source, will appear as a single large pulse spread over a range of several tenths of a mev. with a peak centered at the predominant alpha particle energy. The resolution possible in detecting these alpha particles is determined by measuring the half width of the pulse on this graph, which is accomplished by measuring the energy range encompassed by the curve shape at an amplitude value half its maximum. This half width relationship to average alpha particle energy in terms of a percentage is a measure of the resolution attainable in the system. I have found that employing a semiconductor detector for detecting alpha particles makes possible a resolution of 0.3% width at the half maximum under optimum conditions. It is therefore relatively simple to make an apparatus capable of determining alpha particle energy to 1%. This means that even extremely slight variations in gas density can be determined, and in the altimeter application, for example, makes for extraordinary accuracy.

FIG. 1 of the drawing is a diagrammatic view of a suitable apparatus. It comprises a source 1 of heavy particles, preferably a radioisotope generating alpha particles, e.g. Am$^{241}$. Opposite the source 1 is disposed a semiconductor particle detector 2. The alpha particles generated from the source 1 and referred to by reference numeral 3 cross the intervening air space 4 to impinge upon the detector 2. If the apparatus is housed in an aircraft and exposed to the ambient, the intervening space becomes filled with the gas or air atmosphere corresponding to the aircraft's altitude. The alphas leave the source 1 with an energy of 5.477 mev. Part of that energy is absorbed and lost in the air sample 4, and the remaining energy of the alphas reaching the detector 2 is thus determined by the density of the intervening air sample 4.

The semiconductor detector 2 may be any semiconductor material with band gap below 3 ev., sensitive to particle bombardment, and containing a barrier layer. It may be of germanium or silicon, which are readily commercially available. Gold-germanium surface barriers can be employed, or gold-silicon. Silicon p–n junctions are also satisfactory. When a heavy charged particle is intercepted by such a semiconductor, it loses energy by the formation of electron-hole pairs. If an electric field exists in the semiconductor, the ions separate and give rise to an electric current, the time integral of which is proportional to the energy loss of the particle. If the particle is stopped, it of course loses all of its energy. A reverse biased junction is the simplest way to obtain an electric field in a semiconductor with the further advantage of low background current and thus low noise. For high resolution, semiconductor detectors with the lowest possible noise level should be employed. The depletion region in a diode is its sensitive region, and, preferably, in reaching this region the charged particle should lose a minimum of energy. Therefore, the barrier or junction should be located close to the receiving surface. Also, the particle should be stopped in or near the depletion region, which means that it should have a sufficient thickness for this purpose. The thickness depends upon the resistivity of the material and the reverse bias voltage of the junction. An increase in either resistivity or bias increases the thickness of the depletion region. Thus, in selecting a suitable detector for the apparatus, the energy of the particles or their penetration power must be considered. For alphas of the energy recited above, depletion regions greater than 30 microns in silicon are satisfactory.

The semiconductor junctions can be made by any of the various techniques well known to the art, such as growing, alloying or diffusion. For completeness sake, a suitable technique will be described for making a silicon diode with a p–n junction. A single crystal silicon slice of high resistivity, e.g., 1250 ohm-cm., of p-type conductivity is provided, and, after lapping and etching, a major surface is painted with a phosphorus suspension, e.g. 1 part $P_2O_5$ in 20 parts ethylene glycol. The slice is then placed in a furnace containing an inert atmosphere and heated at 900° C. for about 10 minutes, after which it is slowly cooled to room temperature. The slice is then lightly etched in HF to remove the surface coating. An active mesa is formed by masking the center and etching away the surrounding material to below the junction, which was formed by solid state diffusion of phosphorus, a donor, into the underlying silicon a short distance, converting it to n-type conductivity. As illustrated in FIG. 1, the p-bulk is designated by reference numeral 5, the diffused n-region by numeral 6, and the resultant p–n junction by 7. Contact is then made to the p and n regions 5 and 6 by attaching wires thereto by means of a conductive cement. The diameter of the active mesa may be about 4 mm.

The output circuit for the detector 2 includes a bias battery 8 and a load impedance 9 across which the voltage pulses are developed. The battery 8 biases the junction 7 in the reverse direction to establish the required internal depletion region. A suitable bias is, for example, about 10–30 volts. The impedance 9 may have a value of about $10^9$ ohms.

The voltage pulses produced, as described above, have amplitudes varying over a small range corresponding to the statistical variations in energy of the alphas. The number of pulses per second or other time interval depends upon the energy spectrum of the source, which is preferably monochromatic, and thus the location of the peak of the pulse height or amplitude distribution depends upon the absorption of the sample. To measure the density of an unknown air sample, the apparatus must first be calibrated. To this end, several samples of known density are provided, and the detector pulse height distribution peaks for these samples plotted against their densities. Comparison of the detected peak for any unknown sample with the foregoing graph will enable its density to be determined.

FIG. 1 illustrates apparatus for accomplishing this automatically. The output from the detector is coupled to a scanning window amplifier 10 which first linearly amplifies the pulses and then sorts them into a plurality of narrow ranges or channels according to their amplitudes. Apparatus is commercially available for carrying out this function. The amplifier 10 is in turn coupled to a servomechanism 11, in turn driving a motor drive 12 geared 13 to a rack 14 connected to the source 1. The latter is adapted to be translated toward and away from the detector 2 thus varying the length of the absorption path in the sample 4. A pointer 15 may be coupled to the rack 14 and actuable in accordance with the rack position. The pointer 15 cooperates with a scale 16 preferably calibrated in thousands of feet.

In operation, the system is designed so that the source 1 automatically scans back and forth through its entire possible motion until arrested, which occurs when a predetermined pulse amplitude is developed across the output impedance 9. In other words, the detected energy is maintained constant by varying the distance between the source 1 and the detector 2, or, to put it still another way, the alpha particle energy lost in the sample is maintained constant. As will be evident from the preceding discussion, all alphas with the same energy cause pulses of the same amplitude to appear in the detector output circuit. The window amplifier 10 is adjusted so that the only pulses that appear at its output are those of the predetermined and preselected value. The servomechanism 11 is arranged to energize the drive motor 12 causing it to translate the source 1 back and forth until a position is reached at which the alphas from the source lose a certain amount of energy in the sample 4 so that when detected a series of pulses appear in the detector output circuit whose amplitudes enable them to traverse the amplifier window and actuate the servomechanism to arrest the motor drive 12. The position of the source 1 indicated by the pointer 15 thus determines the sample density. For higher altitudes, lower densities, the source 1 will have to be positioned further from the detector 2 so that its alphas of constant energy will undergo the same energy attenuation as they would have undergone when traversing a shorter, higher-density path. As an example of the dimensions required, for the 5.477 mev. alphas described, approximately 30 cm. spacing between the source and the detector would be required to measure 50,000 feet.

As mentioned before, it is relatively simple to obtain a semiconductor detector capable of measuring alpha particle energy to 1%. By setting the window of the amplifier 10 to a width of one/tenth of the resolution peak, the alpha particle energy is effectively measured to 1/10 of 1%, which would provide an accuracy measurement at an altitude of 25,000 feet to ±50 feet. Thus, the already high resolution of the semiconductor detector is improved by a factor of 10 by the addition of the window amplifier. Further, no collimation of the alpha source is necessary since the servo system only hunts for the maximum count rate. The simplest system for doing this automatically is illustrated, wherein the system automatically scans back and forth until the maximum count rate is detected, and apparatus for accomplishing this are well known to the art. The system could be made more sophisticated by causing it automatically to move in a direction maximizing the count rate. The maximum count rate and the direction of the drive could be determined, for example, by detecting the relative counts in two adjacent windows and driving the source in a direction to equalize the counts. As a further alternative, a null could be detected by determining the first differential of count rate with respect to detector-to-source distance.

Figure 2:
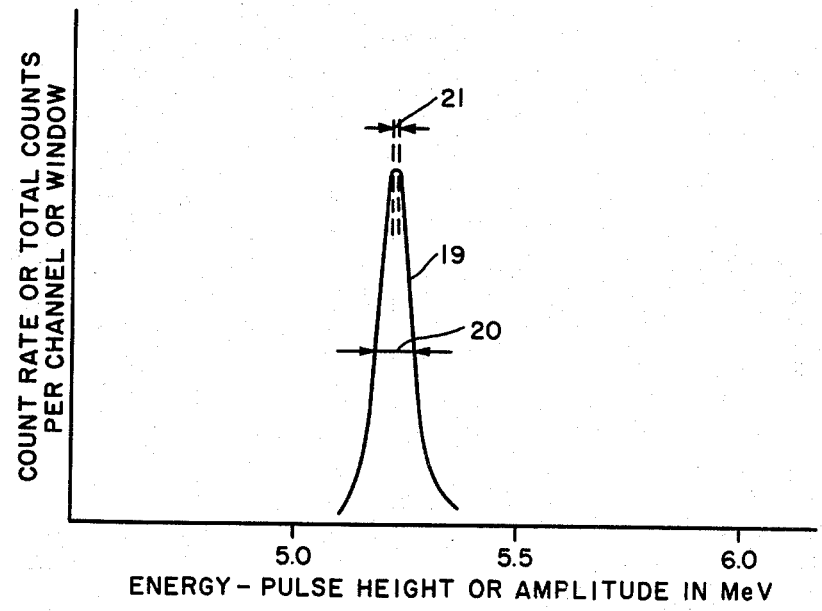
FIG. 2 is a graph relating the intensity of alpha particles detected by a semiconductor detector to its energy.

FIG. 2 shows a typical pulse height distribution curve 19 for alphas from $Am^{241}$ with a semiconductor detector. The half width designated by 20 is about 1% or about 60 kev. Reference numeral 21 designates the amplitude width of the window in the amplifier, which would be about 10% of the half width, leading to a resolution of energy for the alphas of about 0.1%.

An important advantage of the invention is that the radiation change measured involves energy and not intensity. The system functions independently of the number of particles received. Thus, factors that modify the radiation intensity have no effect on the apparatus of the invention, which is geared to energy changes of the radiation. For example, the decline in intensity of the radioisotope with life requires no changes or recalibrations of the equipment.

While I have described my invention in connection with specific embodiments and applications, other modifications thereof will be readily apparent to those skilled in this art without departing from the spirit and scope of the invention as defined in the appended claims.

What is claimed is:

1. Gas density measuring apparatus comprising a source of heavy charged particles for injecting particles into a sample of the gas whose density is to be measured and which lies in the range of about 1.0 to 0.1 mg./cm.$^2$, a semiconductor radiation detector positioned to receive and detect the particles after passage through the gas sample and to generate a signal representative only of the energy attenuation of the said particles by the said gas sample, and means coupled to the radiation detector for utilizing the said signal to determine the density of the said gas sample.

2. Apparatus as set forth in claim 1, wherein the particles are selected from the group consisting of electrons, protons, deuterons, He$^3$ particles, alphas and fission fragments.

3. Apparatus as set forth in claim 1 wherein the detector contains a barrier layer.

4. Altimeter apparatus comprising a source of alpha particles for injecting alpha particles into a sample of air whose density is to be measured and lying in the range of 1.0 to 0.1 mg./cm.$^2$, a low-noise semiconductor radiation detector positioned to receive and detect the alpha particles after passage through the air sample and to generate a signal representative only of the energy attenuation of the said alpha particles by the said air sample, and means coupled to the radiation detector for utilizing the said signal to determine the density of the said air sample.

5. An altimeter as set forth in claim 4 wherein the detector is constituted of a material whose band-gap is less than 3 e.v. and contains a back-biased barrier layer.

6. An altimeter as set forth in claim 5 wherein the detector is a silicon body with a p-n junction close to the receiving surface, and means are provided for back-biasing the junction to establish an active internal depletion region with a thickness of the order of tens of microns adjacent the surface.

7. An altimeter as set forth in claim 4 wherein the source is monochromatic, and the alphas have an energy of the order of 5 mev., and the altimeter is useful at altitudes between 6,000 and 60,000 feet.

8. Gas density measuring apparatus comprising a source of heavy charged particles for injecting particles into a sample of the gas whose density is to be measured, a semiconductor diode radiation detector postiioned to receive and detect the particles after passage through the gas sample and to generate a signal representative only of the energy attenuation of the said particles by the said gas sample, changes in the gas density of the said gas sample causing deviations in the signal level, means connected to the detector for sensing said deviations, and a servo-mechanism coupled to said last-named means for varying the source-detector spacing substantially to eliminate said deviation, said value of spacing being indicative of the density of the said gas sample.

9. Altimeter apparatus as set forth in claim 4 wherein said utilizing means includes a window amplifier adjusted to pass only voltage pulses within a narrow preselected range.

References Cited by the Examiner
UNITED STATES PATENTS

| | | | |
|---|---|---|---|
| 2,908,819 | 10/59 | Marx | 250—43.5 |
| 2,975,286 | 3/61 | Rappaport | 250—83.3 |
| 3,025,396 | 3/62 | Laughlin | 250—43.5 |
| 3,043,955 | 7/62 | Friedland et al. | 250—83.3 |

RALPH G. NILSON, *Primary Examiner.*